United States Patent
Willis

(10) Patent No.: US 7,376,341 B2
(45) Date of Patent: May 20, 2008

(54) MODIFYING VIDEO SIGNALS BY CONVERTING NON-INTRA PICTURES

(75) Inventor: Donald H. Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1375 days.

(21) Appl. No.: 09/904,022

(22) Filed: Jul. 12, 2001

(65) Prior Publication Data

US 2003/0012561 A1    Jan. 16, 2003

(51) Int. Cl.
*H04N 7/26* (2006.01)
*H04N 5/76* (2006.01)

(52) U.S. Cl. .......................... 386/111; 386/68

(58) Field of Classification Search ............. 386/6–8, 386/33, 68, 81–82, 111–112, 125; 348/400, 348/408, 409, 415; *H04N 5/76, 5/781*
See application file for complete search history.

(56) References Cited

U.S. PATENT DOCUMENTS

| | | | |
|---|---|---|---|
| 5,726,711 A | | 3/1998 | Boyce et al. |
| 6,023,553 A | * | 2/2000 | Boyce et al. ............. 386/109 |
| 6,078,721 A | * | 6/2000 | Uchimi et al. ............. 386/68 |
| 6,122,433 A | * | 9/2000 | McLaren .................. 386/68 |
| 6,201,925 B1 | | 3/2001 | Brewer et al. |
| 6,400,886 B1 | * | 6/2002 | Brewer et al. ............. 386/52 |
| 6,944,226 B1 | * | 9/2005 | Lin et al. ................. 375/240.2 |
| 2003/0190146 A1 | * | 10/2003 | Gotoh et al. .............. 386/70 |
| 2005/0163478 A1 | * | 7/2005 | Suzuki .................... 386/68 |

FOREIGN PATENT DOCUMENTS

| | | |
|---|---|---|
| CN | 1220065 A | 6/1999 |
| EP | 1009166 | 6/2000 |

OTHER PUBLICATIONS

EP Search Report, Nov. 3, 2005.

* cited by examiner

*Primary Examiner*—Thai Q. Tran
*Assistant Examiner*—Nigar Chowdhury
(74) *Attorney, Agent, or Firm*—Joseph J. Laks; Robert E. Levy; Jorge Tony Villabon

(57) ABSTRACT

The invention concerns a method (200) and system (10) for recording onto a storage medium (26) a video segment. The method includes the steps of: receiving the video segment (210) in which the video segment contains at least one predictive picture; and selectively converting the at least one predictive picture into an intra picture thereby replacing the at least one predictive picture with the intra picture. In one arrangement, the video segment can contain at least one introductory predictive picture, and the converting step can further include selectively decoding a predetermined number of the introductory predictive pictures to obtain a properly decoded predictive picture (212). Additionally, the video segment can contain at least one subsequent predictive picture and the converting step can further include selectively decoding the subsequent predictive pictures (214) and selectively re-encoding into intra pictures the subsequent predictive pictures, the introductory predictive pictures or a combination thereof (216).

10 Claims, 2 Drawing Sheets

MODIFYING VIDEO SIGNALS BY CONVERTING NON-INTRA PICTURES

BACKGROUND OF THE INVENTION

1. Technical Field

The inventive arrangements relate generally to video recording systems and more particularly to video recording systems that record digitally encoded video sequences onto disc media such as recordable digital video discs, hard drives and magneto optical discs.

2. Description of Related Art

MPEG video generally uses three types of picture coding methods: Intra (I) pictures, predictive (P) pictures and bidirectional predictive (B) pictures. I pictures are encoded or decoded independently of any other picture. This creates a reference picture from which P and B pictures, or non-I pictures, can be constructed.

A number of MPEG video signals, however, are encoded without I pictures. In particular, many U.S. cable systems broadcast MPEG signals that do not contain I pictures. At first glance, such a video signal appears impossible to decode since there are no I pictures from which to construct the P and B pictures.

Nevertheless, a video signal without any I pictures can be decoded by most MPEG decoders because a separate portion of each P picture in the signal is typically composed of I macroblocks. That is, successive P pictures containing I macroblocks can be used to eventually properly decode a P picture, which can then be used to decode the remaining pictures in the video signal. As an example, in a block of five P pictures, twenty percent of each P picture can contain I macroblocks. For example, the top twenty percent of the first P picture can be composed of I macroblocks and the lower eighty percent can be composed of non-I macroblocks. Referring to the second P picture in the video signal, the portion representing the twenty percent of the picture immediately below the top twenty percent can comprise I macroblocks while the lower sixty percent and the top twenty percent can be composed of non-I macroblocks. Thus, a different portion of each successive P picture contains I macroblocks. Hence, the bottom twenty percent of the last P picture can contain I macroblocks.

These I macroblocks, along with the non-I macroblocks contained in the P pictures, can be used to assemble each successive P picture. Specifically, as each P picture is decoded, the I and non-I macroblocks can be stored in memory. As such, the decoder can generally properly decode the fifth P picture, from which the remaining P and B pictures can be decoded. During normal playback of a video signal having no I pictures, there is a brief period in which the picture quality suffers at the initiation of the playback. This is because the pictures at the beginning of the playback must be constructed from the P pictures that are not yet properly decoded. As an example, the first P picture in the playback signal normally contains the first portion of I macroblocks. Thus, the P and B pictures that are constructed from the first P picture cannot be properly decoded, as the first P picture contains only roughly twenty percent of the information needed to produce these pictures. As the playback continues, however, the picture quality improves since more of the P pictures are decoded thereby providing a greater number of correctly decoded I and non-I macroblocks until a properly decoded P picture is acquired. This initial reduction in picture quality is acceptable since it is brief, as a properly decoded picture is usually constructed within the first one-half to one second of normal playback of the video.

Significantly, however, the delay in building a properly decoded P picture in a signal lacking I pictures may be prolonged during a trick mode. As an example, during a fast-forward trick mode, a plurality of pictures are skipped to speed up the playback. If P pictures containing the I macroblocks are skipped, then it will take longer to properly decode a P picture for decoding the remaining P and B pictures. As a result, a greater number of pictures constructed during the trick mode will suffer from a degradation in picture quality. Additionally, the delay in producing an acceptable playback increases for a faster playback speed, as a greater number of P pictures may be skipped to accommodate the faster playback. Slow motion playback can contribute to a longer delay in producing the properly decoded P picture as well. This delay is because pictures are typically repeated during slow motion playback. Since pictures are being repeated, the properly decoded P picture will take longer to create because there will be a delay in decoding the macroblocks from the five separate P pictures. As a result, the acceptable reduction in picture quality during normal playback may become unacceptable during trick mode operation. Thus, a need exists for a method and system of modifying video signals by converting non-I pictures into P pictures to overcome the various detriments described above.

SUMMARY OF THE INVENTION

The present invention concerns a method of recording onto a storage medium a video segment. The method includes the steps of: receiving the video segment in which the video segment contains at least one predictive picture; and selectively converting the at least one predictive picture into an intra picture thereby replacing the at least one predictive picture with the intra picture. In one arrangement, the video segment can contain at least one introductory predictive picture, and the converting step can further include the step of selectively decoding a predetermined number of the introductory predictive pictures to obtain a properly decoded predictive picture. In addition, a portion of each introductory predictive picture can contain intra macroblocks, and the predetermined number can be based in part on the amount of intra macroblocks in each introductory predictive picture.

In another arrangement, the video segment can contain at least one subsequent predictive picture, and the converting step can further include the steps of: selectively decoding subsequent predictive pictures; and selectively re-encoding into intra pictures the subsequent predictive pictures, the introductory predictive pictures or a combination thereof. In one aspect of the above method, the video segment can be an MPEG video segment that does not contain any intra pictures. The present invention also concerns a system for recording onto a storage medium a video segment. The system includes: a receiver for receiving the video segment in which the video segment contains at least one predictive picture; and a video processor programmed to selectively convert the at least one predictive picture into an intra picture thereby replacing the at least one predictive picture with the intra picture. The system also includes suitable software and circuitry to implement the method as described above.

DETAILED DESCRIPTION

Figure 1:
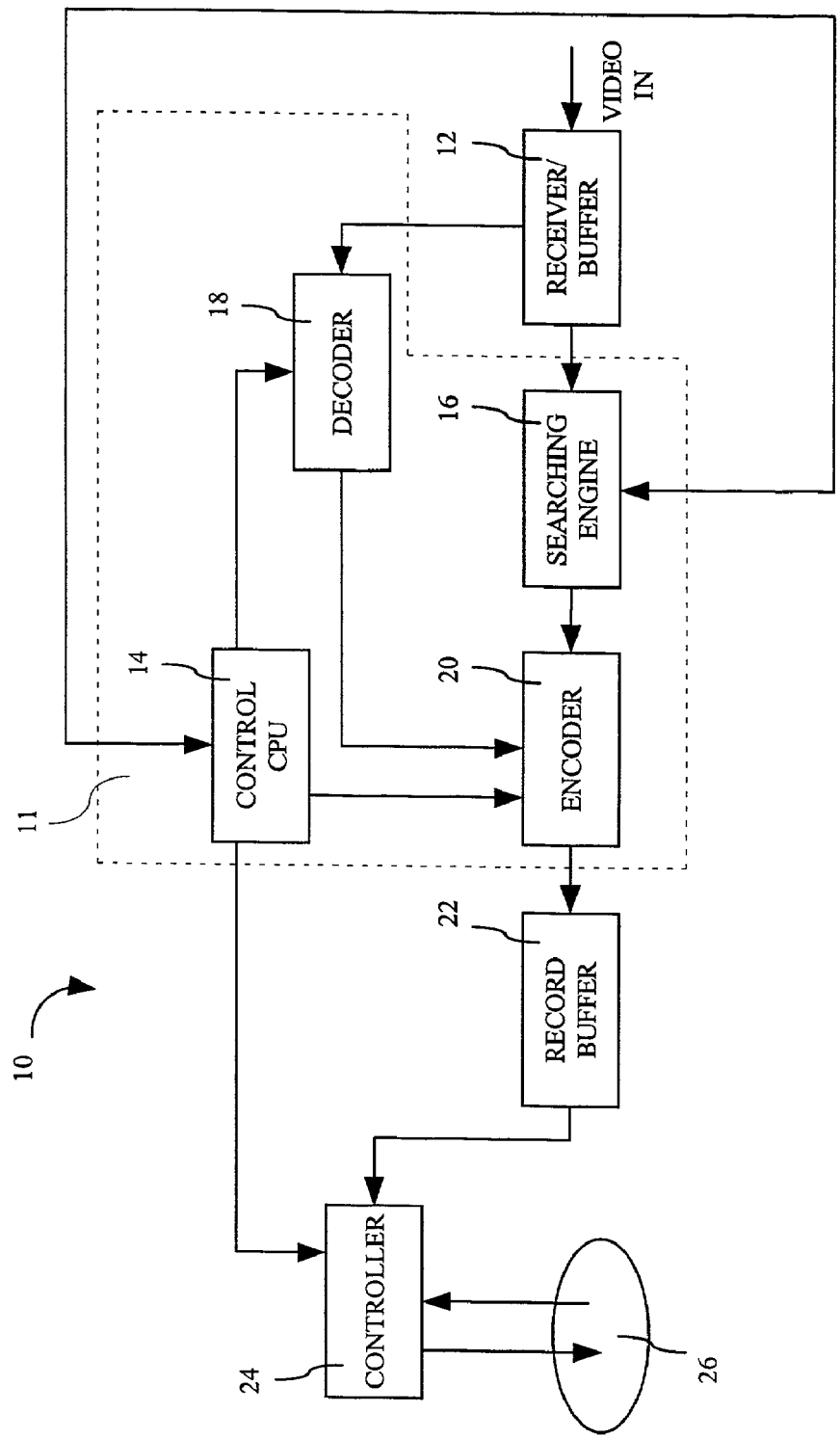
FIG. 1 is a block diagram of a storage medium device that can modify a video signal by converting non-I pictures into I pictures in accordance with the inventive arrangements herein.

A system or storage medium device 10 for implementing the various advanced operating features in accordance with the inventive arrangements is shown in block diagram form in FIG. 1. The invention, however, is not limited to the particular device illustrated in FIG. 1, as the invention can be practiced with any other storage medium device capable of receiving a digitally encoded signal. In addition, the device 10 is not limited to reading data from or writing data to any particular type of storage medium, as any storage medium capable of storing digitally encoded data can be used with the device 10.

The device 10 can include a controller 24 for reading data from and writing data to a storage medium 26. The device 10 can also have a control central processing unit (CPU) 14. Control and data interfaces can also be provided for permitting the control CPU 14 to control the operation of an encoder 20, a decoder 18, a searching engine 16 and the controller 24. Suitable software or firmware can be provided in memory for the conventional operations performed by control CPU 14. Further, program routines can be provided for controlling CPU 14 in accordance with the inventive arrangements. It should be understood that all or portions of the control CPU 14, the searching engine 16, the decoder 18 and the encoder 20 can be considered a video processor 11 within contemplation of the present invention.

In operation, a video signal containing one or more predictive pictures can enter a receiver or buffer 12. The P pictures in this video signal can contain a number of I and non-I macroblocks. In one arrangement, the signal does not contain any I pictures; however, it should be noted that the invention is not limited in this regard, as a signal containing I pictures can be modified in accordance with the inventive arrangements. From the buffer 12, the video signal can be sent to the searching engine 16 and then the encoder 20. Meanwhile, the control CPU 14 can signal the decoder 18 to selectively decode a number of the pictures in the video signal. As will be explained in detail below, the I and non-I macroblocks from the initial P pictures in the video signal can be used to obtain a properly decoded P picture, which can then be used to decode one or more subsequent P pictures in the video signal. The encoder 20 can then re-encode one or more of the initial P pictures and/or the subsequent P pictures into I pictures.

To locate the P pictures to be decoded and/or re-encoded, the searching engine 16 can search the video signal by locating each picture's start code. Once a start code is located, the searching engine 16 can signal the control CPU 14. The control CPU 14 can then determine whether the picture is an I, B or P picture by focusing on that particular picture's start code. The control CPU 14 can then signal the encoder 20 to decode the appropriate number of P pictures; similarly, the control CPU 14 can signal the encoder 20 to re-encode any number of the decoded P pictures into an I picture thereby replacing one or more P pictures with an I picture and creating a modified video signal. Once modified, the video signal can be sent to the record buffer 22 where the signal can be temporarily stored. From the record buffer 22, the signal can be received by the controller 24 and then recorded onto the storage medium 26. This overall process will be explained in greater detail below.

Notably, the present invention can be realized in hardware, software, or a combination of hardware and software. Machine readable storage according to the present invention can be realized in a centralized fashion in one computer system, for example the control CPU 14, or in a distributed fashion where different elements are spread across several interconnected computer systems. Any kind of computer system or other apparatus adapted for carrying out the methods described herein is acceptable.

Specifically, although the present invention as described herein contemplates the control CPU 14 of FIG. 1, a typical combination of hardware and software could be a general purpose computer system with a computer program that, when being loaded and executed, controls the computer system and a recording system similar to that shown in FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 14 described above.

Modifying Video Signals by Converting Non-I Pictures

According to the inventive arrangements, the poor picture quality associated with trick mode playback of recorded video not having I pictures can be improved by converting one or more non-I pictures contained in a video signal into one or more I pictures. These I pictures can replace these non-I pictures thereby creating a modified video signal. Subsequently, these I pictures can then be used to reconstruct the remaining non-I pictures contained in the video during either normal or trick mode playback of the recorded video.

Figure 2:
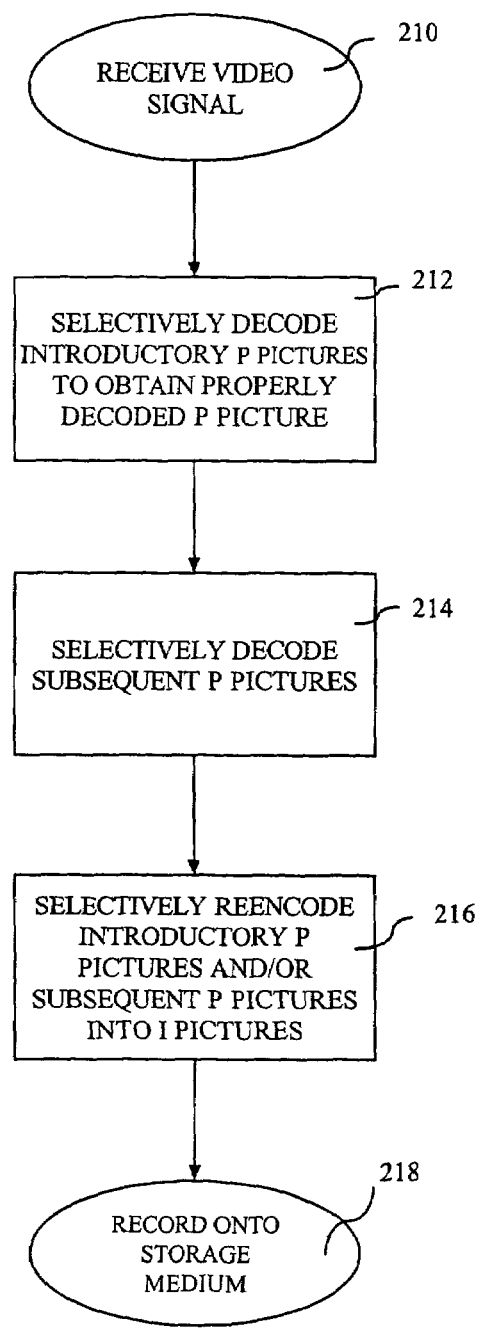
FIG. 2 is a flow chart that illustrates the operation of modifying a video signal by converting non-I pictures into I pictures.

FIG. 2 illustrates a flowchart 200 that demonstrates one way in which video containing P pictures with I macroblocks—typically, a signal with no I pictures—can be modified for optimal trick mode performance. At step 210, a video signal containing at least one P picture can be received. As noted earlier, many video broadcast signals, particularly U.S. cable transmissions, do not contain I pictures. Many of these signals are made up of a number of video sequences containing a predetermined number of non-I pictures. The following is an example of a typical video sequence contained in such a signal:

SH $B_0$ $B_1$ $P_2$ $B_3$ $B_4$ $P_5$ $B_6$ $B_7$ $P_8$ $B_9$ $B_{10}$ $P_{11}$ $B_{12}$ $B_{13}$ $P_{14}$

As shown, the example contains only non-I pictures (P and B pictures) and does not contain any I pictures. A portion of each P picture is typically encoded with I macroblocks. During normal playback, the pictures in this sequence can be constructed from the macroblocks, both I and non-I macroblocks, in the P pictures. Experience has shown that encoding approximately twenty percent of each P picture with I macroblocks and placing two B pictures between P pictures in a signal containing no I pictures works well. Accordingly, the typical sequence as shown above is commonly used and will be used to help explain the invention. Those skilled in the art, however, will appreciate that other video sequences lacking I pictures are also commonly used and may be considered typical. In fact, any video signal that contains at least one P picture can be modified in accordance with the inventive arrangements; this includes video signals that contain I pictures.

The pictures in the typical video sequence shown above can represent progressive frames, non-progressive frames or field pictures, as the invention is not limited to any particular picture format. The symbol "SH" stands for sequence header, which is a header that contains decoding information about the particular video sequence to which it is assigned. It should be noted, however, that the invention is not limited to such an arrangement, as the invention can be practiced with video sequences that do not have sequence headers.

At step 212, once a video signal is received, one or more of the P pictures contained in the signal can be decoded until a properly decoded P picture is obtained. In one arrangement, the number of the P pictures to be decoded can depend on the amount of I macroblocks in the P pictures. As an example, in the video sequence reproduced above, the five P pictures—$P_2$, $P_5$, $P_8$, $P_{11}$ and $P_{14}$—can be decoded, which can result in picture $P_{14}$ being properly decoded. As discussed earlier, five P pictures can be used to properly decode a P picture because generally a separate portion (approximately twenty percent) of each P picture in the typical video sequence is comprised of I macroblocks. It should be noted, however, that the invention is not limited to the preceding example, as any other suitable number of P pictures can be decoded for purposes of obtaining a properly decoded P picture. For instance, these initial P pictures can contain different percentages of I macroblocks. For purposes of clarity, the P pictures used to obtain the properly decoded P picture can be referred to as introductory P pictures.

Once a properly decoded P picture is obtained from decoding the introductory P pictures, the properly decoded P picture can be used to decode selectively one or more subsequent P pictures in the video signal, as shown in step 214. In one arrangement, it is preferable that all the subsequent P pictures be decoded; however, the invention is not limited in this regard, as any other suitable number of subsequent P pictures can be decoded. In another arrangement, if one or more P pictures are skipped once a properly decoded P pictures is acquired, i.e., less than all the P pictures in the video segment are decoded, one or more P pictures following the skipped P picture(s) can be used to create another properly decoded P picture for purposes of decoding the subsequent P pictures. The P pictures following the skipped P picture that are used to construct another properly decoded P picture can be referred to as introductory P pictures as well.

At step 216, once the desired number of subsequent P pictures are decoded, one of more of the selectively decoded subsequent P pictures can be re-encoded into an I picture. In another arrangement, one or more of the introductory P pictures used for purposes of obtaining the properly decoded P picture can also be re-encoded into an I picture. In either arrangement, the I picture can replace the original P picture in the video signal. The following represents an example of this process:

SH $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $P_{14}$

As shown, introductory P picture $P_2$ has been re-encoded into I picture $I_2$. It should be noted, however, that the invention is not limited to this example or to any particular re-encoding algorithm, as any number of introductory or subsequent P pictures can be re-encoded into an I picture.

Once the video signal is modified, it can be recorded onto a storage medium in accordance with step 218. Re-encoding into I pictures one or more of the introductory P pictures, one or more of the subsequent P pictures or a combination thereof can eliminate the delay in obtaining a properly decoded P picture, as the video signal now contains one or more I pictures for purposes of constructing the remaining pictures in the video.

What is claimed is:

1. A method of recording onto a storage medium a video segment, comprising the steps of:
   receiving said video segment, wherein said video segment contains at least one introductory predictive picture containing intra macroblocks; and
   selectively converting said at least one introductory predictive picture into an intra picture thereby replacing said at least one introductory predictive picture with said intra picture in said video segment.

2. The method according to claim 1, wherein said converting step further comprises the step of selectively decoding a predetermined number of said introductory predictive pictures to obtain a properly decoded predictive picture.

3. The method according to claim 2, wherein said predetermined number is based in part on the amount of said intra macroblocks in said introductory predictive picture.

4. The method according to claim 2, wherein said video segment contains at least one subsequent predictive picture and said converting step further comprises the steps of:
   selectively decoding said subsequent predictive pictures; and
   selectively re-encoding into intra pictures predictive pictures selected from the group comprising said subsequent predictive pictures or said introductory predictive pictures.

5. The method according to claim 1, wherein said video segment is an MPEG video segment that does not contain any intra pictures.

6. A system for recording onto a storage medium a video segment comprising:
   a receiver for receiving said video segment, wherein said video segment contains at least one intaductory predictive picture containing intra macroblocks; and
   a video processor programmed to selectively convert said at least one introductory predictive picture into an intra picture thereby replacing said at least one introductory predictive picture with said intra picture in said video segment.

7. The system according to claim 6, wherein said video processor is further programmed to selectively decode a predetermined number of said introductory predictive pictures to obtain a properly decoded predictive picture.

8. The system according to claim 7, wherein said predetermined number is based in part on the amount of said intra macroblocks in each said introductory predictive picture.

9. The system according to claim 7, wherein said video segment contains at least one subsequent predictive picture and said video processor is further programmed to selectively decode said subsequent predictive pictures and selectively re-encode into intra pictures predictive pictures selected from the group comprising said subsequent predictive pictures or said introductory predictive pictures.

10. The system according to claim 6, wherein said video segment is an MPEG video segment that does not contain any intra pictures.

* * * * *